United States Patent
Larsson

(10) Patent No.: US 7,924,949 B2
(45) Date of Patent: Apr. 12, 2011

(54) ADVANCED MULTI-SENSOR PROCESSING

(75) Inventor: Peter Larsson, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 12/588,109

(22) Filed: Oct. 5, 2009

(65) Prior Publication Data

US 2010/0098014 A1 Apr. 22, 2010

Related U.S. Application Data

(63) Continuation of application No. 10/584,132, filed as application No. PCT/EP2004/052701 on Oct. 28, 2004, now Pat. No. 7,706,477.

(30) Foreign Application Priority Data

Dec. 23, 2003 (EP) .................................. 03104952

(51) Int. Cl.
*H03D 1/00* (2006.01)

(52) U.S. Cl. ........ 375/340; 375/148; 375/140; 375/149; 370/331; 370/335; 370/342; 455/438; 455/443; 455/436

(58) Field of Classification Search .................. 375/260, 375/130, 148, 340, 140, 149; 370/329, 328, 370/344, 310, 335, 342, 331; 455/442, 438, 455/443, 436
See application file for complete search history.

(56) References Cited

U.S. PATENT DOCUMENTS

| | | | |
|---|---|---|---|
| 5,970,143 A | 10/1999 | Schneier et al. | |
| 5,970,147 A | 10/1999 | Davis | |
| 5,970,417 A * | 10/1999 | Toyryla et al. | 455/519 |
| 6,320,852 B1 | 11/2001 | Obuchi et al. | |
| 6,339,612 B1 | 1/2002 | Stewart et al. | |
| 6,445,342 B1 | 9/2002 | Thomas et al. | |
| 6,452,981 B1 | 9/2002 | Raleigh et al. | |
| 6,640,088 B2 | 10/2003 | Thomas et al. | |
| 6,674,733 B1 | 1/2004 | Huusko | |
| 6,795,424 B1 * | 9/2004 | Kapoor et al. | 370/343 |
| 2003/0053524 A1 | 3/2003 | Dent | |
| 2004/0101034 A1 | 5/2004 | Ben-David et al. | |
| 2004/0208251 A1 | 10/2004 | Learned et al. | |

(Continued)

FOREIGN PATENT DOCUMENTS

WO 02/37872 A 5/2002

(Continued)

OTHER PUBLICATIONS

Zhang et al, "Multiuser Detection with Cell Diversity for DS/CDMA Systems", IEEE, vol. 2, Sep. 23, 2000, pp. 670-672.

(Continued)

*Primary Examiner* — Eva Y Puente
(74) *Attorney, Agent, or Firm* — Nixon & Vanderhye, P.C.

(57) ABSTRACT

Each receiving node (120) of a plurality of receiving nodes (120-1, 120-2 and 120-3) in a wireless network converts a superposition of signals received from a plurality of transmitting nodes (10) to produce soft complex signal information. The soft complex signal information associated with the considered plurality of receiving nodes are collected, and jointly detect signal information transmitted from at least a subset of the plurality of transmitting nodes (10) based on the collected soft complex signal information. The collected soft signal information generally retains phase and amplitude information, and the transmitted signals are preferably detected in a joint detection process based on a complex channel representation and collected soft signal information.

23 Claims, 13 Drawing Sheets

U.S. PATENT DOCUMENTS

2007/0149135 A1  6/2007  Larsson et al.

FOREIGN PATENT DOCUMENTS

WO    02/37872 A2    5/2002

OTHER PUBLICATIONS

Grant et al, "Intercell Interference Cancellation for TD-CDMA Mobile Systems", IEEE vol. 1, Sep. 18, 2000, pp. 720-723.

Holtzman, "DS/CDMA Successive Interference Cancellation", Spread Spectrum Techniques and Applications, IEEE ISSSTA '94, IEEE Third International Symposium on Oulu, Finland, Jul. 4-6, 1994, New York, NY Jul. 4, 1994, pp. 69-78.

Anton-Haro et al, "Interference Cancellation for Third Generation Mobile Radio Systems", Personal, Indoor and Mobile Radio Communications, 1997, Waves of the Year 2000, PIMRC '97, the 8$^{th}$ IEEE International Symposium on Helsinki, Finland, Sep. 1-4, 1997, New York, NY, vol. 1, Sep. 1, 1997, pp. 32-36.

2001, Artech House, XP002316704, pp. 48-51.

Wong et al, "Space-Time Coding", Aug. 19, 2003.

Mucchi, LMMSE Receivers Performance Under Non-Ideal Conditions, PIMRC 2002.

"W-CDMA Mobile Communications System", edited by Keiji Tachikawa, Wiley & Sons, 2002, pp. 56-59, 66-73 Kettunen, "Soft Detection and Decoding in Wideband CDMA Systems", Report 38, Mar. 2003.

International Search Report of PCT/EP2004/052701, mailed Mar. 3, 2005.

Zhang et al., "Multiuser detection with cell diversity for DS/CDMA systems", IEEE, vol. 2, Sep. 23, 2000, pp. 670-675, XP010532329.

Grant et al., "Intercell interference cancellation for TD-CDMA mobile systems", IEEE, vol. 1, Sep. 18, 2000, pp. 720-723, XP010520728.

Holtzman, "DS/CDMA successive interference cancellation", Spread Spectrum Techniques and Applications, 1994, pp. 69-78, XP010129711.

Anton-Haro et al., "Interference cancellation for third generation mobile radio systems", Personal, indoor and Mobile Radio Communications, 1997, Waves of the Year 2000, vol. 1, Sep. 1, 1997, pp. 32-36, XP010247501.

2001 Artech House, XP002316704.

Indian Office Action mailed Sep. 16, 2010 in corresponding Indian Application 4112/DELNP/2006.

* cited by examiner

ADVANCED MULTI-SENSOR PROCESSING

This application is a continuation of U.S. patent application Ser. No. 10/584,132 filed Jun. 23, 2006 now U.S. Pat. No. 7,706,477 which is the US national phase of international application PCT/EP2004/052701, filed 28 Oct. 2004, which designated the U.S. and claims priority of EP 03104952.1, filed 23 Dec. 2003, the entire contents of each of which are hereby incorporated by reference.

TECHNICAL FIELD OF THE INVENTION

The present invention generally concerns wireless communication networks such as digital cellular networks, and especially uplink signal processing and detection and decoding in wireless networks.

BACKGROUND

One way of enhancing network performance is to utilize signals from multiple sensors or antennas in the network. There are a variety of existing techniques for exploiting signals from multiple sensors or antennas, especially in relation to the uplink in a cellular network.

Advanced antenna solutions such as adaptive antenna systems and MIMO (Multiple-Input Multiple-Output) systems can be used to enhance system performance. Space-time coding as represented by references [1], [2] and [3] can be regarded as a method for providing diversity for a wireless fading channel using multiple transmit and/or receive antennas. FIG. 1 schematically illustrates an example of a classical MIMO system, where a transmitting node 10 has multiple m transmit antennas and a receiving node 20 has multiple n receive antennas. In matrix form, the channel model can be expressed as:

$$y = Hx + w$$

$$x = G(c_i, \ldots, c_p),$$

where y is the received signal vector, H is a n by m complex channel matrix, x is the transmitted signal vector, w is a vector representation of white noise, G is a code matrix and c is a symbol in a code book, and p is the number of symbols per block. The complex channel gain matrix H can be written as:

$$H = \begin{bmatrix} h_{11} & \cdots & h_{1m} \\ \vdots & \ddots & \vdots \\ h_{n1} & \cdots & h_{nm} \end{bmatrix}$$

where $h_{ij}$ is the complex channel gain from transmit antenna j in the transmitting node to receive antenna i in the receiving node.

Soft handover is an entirely different method of exploiting so-called multi-sensor information, now further up in the network at a combining point and based on information from multiple base stations. In soft handover, the signal from a mobile terminal is received by two or more base stations, which transfer respective decoded data to an RNC (Radio Network Controller) for combining.

Softer handover in WCDMA refers to the situation when a mobile terminal is in the overlapping coverage area of two or more adjacent sectors of a base station, where the signal from the mobile is received by each sector, and then transferred to the same RAKE receiver for maximum ratio combining.

In practice, WCDMA (Wideband Code Division Multiple Access) normally employs a rather "hard" handover known as macro selection diversity rather than ideal soft handover. This typically means that some quality or reliability indicator, such as a CRC checksum, received pilot signal strength or a frame reliability indicator, is used for enabling dynamic selection of the better data and/or frame from the base stations.

FIG. 2 schematically illustrates uplink diversity in a WCDMA system, in which a mobile terminal 10 establishes radio links with multiple base stations (or node Bs) 20-1 and 20- and/or sectors simultaneously. Softer handover, also referred to as intersector diversity, here involves the reception of signals from the mobile terminal at different sectors within the same base station 20 followed by maximum ratio combining (MRC) on soft baseband signals in the MRC combiner 22 prior to channel decoding in the channel decoder 24.

Soft handover, also referred to as intercell site diversity, typically involves the transmission of hard decision data after channel decoding, together with associated reliability information, from multiple base stations 20-1 and 20-2 to the RNC (Radio Network Controller) 30 for per-user selection combining of the decoded data according to the reliability information, for example as described in reference [4].

Ideal soft handover operates on soft baseband signals that are transferred from the base stations to a combining point for maximum ratio combining or similar combining per-user (when noise and interference from different base stations are uncorrelated), for example as described in references [5] and [6].

Reference [5] presents an uplink protocol based on the multiple-to-one relationship between base stations and mobile. As illustrated in FIG. 3, the uplink protocol involves transferring non-decoded quantized information from a number of receiving base stations 20-1 and 20-2 to a so-called controlling base station 20-3. The controlling base station 20-3 then employs majority combining, maximum ratio combining or maximum probability combining of the received quantized information for optimal decoding of the mobile 10.

Reference [6] is also related to the multiple-to-one relationship between base stations and mobile, and concerns the situation of several base stations receiving a signal from a mobile terminal and forwarding information to a central exchange node for decoding of the mobile.

Common to all known soft handover is that per-user combining is employed and that interference from other mobile terminals is generally treated as unstructured noise, thus failing to optimally reflect and consider the actual situation at the receiving base stations.

RELATED ART

Reference [7] relates to Linear Minimum Mean Square Error (LMMSE) receivers capable of suppressing multiple access interference and near-far occurrences in a CDMA system operating in multi-path fading wireless channels.

Reference [8] is a recently published doctoral thesis on the subject of soft detection and decoding in WCDMA systems.

SUMMARY

The technology disclosed herein overcomes these and other drawbacks of the prior art arrangements.

It is a general object of the technology disclosed herein to improve the performance of a wireless communication network such as a digital cellular network.

It is an object of the technology disclosed herein to more optimally exploit signals from multiple base stations or similar receiving nodes in a wireless network. In particular, it is desirable to improve the uplink signal processing in a cellular network.

Yet another object of the technology disclosed herein is to find a way to keep the costs for transporting the data required for the purpose of uplink signal processing at a reasonable level.

It is a particular object to provide a method and system for detection of signal information in a wireless communication network.

It is also an object of the technology disclosed herein to provide a network node for signal detection in a wireless communication network.

The technology disclosed herein considers a plurality of receiving nodes such as base stations in a wireless network. Each receiving node converts a superposition of signals received from a plurality of transmitting nodes such as mobile terminals to produce soft complex signal information. A basic idea according to the technology disclosed herein is to collect soft complex signal information associated with the considered plurality of receiving nodes over a transport network, and jointly detect signal information transmitted from at least a subset of the plurality of transmitting nodes based on the collected soft complex signal information. The collected soft signal information generally retains phase and amplitude information, and the transmitted signals are preferably detected in a joint detection process based on a complex channel representation and the collected soft signal information.

The soft signal information is usually represented by soft complex baseband signals, although any other type of soft information retaining phase and amplitude information may be utilized by the technology disclosed herein. Complex samples can always be represented by a real and imaginary component (rectangular coordinate system), or equivalently, by amplitude and phase (polar coordinate system). Soft information generally has a higher information content than the detected or decoded information, and is usually represented by multiple (often binary) digits per signal component.

Instead of per-user combining, the technology disclosed herein provides joint detection of a plurality of transmitting nodes or mobiles. The technology disclosed herein does not treat interference from other transmitting nodes as unstructured noise, in clear contrast to cellular systems of today. In effect, the signal processing approach suggested by the technology disclosed herein rather strives to cancel such interference.

The process of jointly detecting signal information is preferably based on the collected soft complex signal information and a complex channel representation related to the plurality of considered receiving and transmitting nodes. The complex channel representation is preferably represented by a complex channel gain matrix.

In a practical realization, a complex channel gain matrix may be determined by explicit channel estimation. Alternatively, different combinations of complex channel gain matrix and symbol hypothesis vector may be tested in a joint search procedure to find an optimal symbol hypothesis vector that will then represent the detected signal information. Any general detection algorithm, such as Zero Forcing (ZF), Maximum Likelihood Detection—Multi-User Detection (MLD-MUD) and Linear Minimum Mean Squared Error (LMMSE), may be used by the technology disclosed herein. Once detected, the signal information may be used as a basis for subsequent decoding processes such as error correction decoding and source decoding. Optionally, the decoding process can be considered as an integrated part of the detection process, e.g. by using multi-user based decoding. This means that detection can be done per bit or symbol or per sequence of bits or symbols, for multiple users.

The main benefit of this approach over other state-of-the-art techniques is that it enables/offers the optimal formulation for uplink signal processing, especially if all nodes in the wireless network are under consideration in a centralized approach.

In the centralized approach, soft complex signal information is collected from the considered receiving nodes and processed in a central node. Although optimal from a signal processing point of view, the centralized multi-sensor processing approach may lead to somewhat higher transport costs for the network operators because of the large amounts of information that may have to be transported relatively long distances (depending on the size of the network).

Therefore, the technology disclosed herein also proposes a distributed approach to the novel multi-sensor processing scheme. The distributed approach is based on partitioning receiving nodes into multiple groups, and collecting, for each group, soft complex signal information associated with the receiving nodes of the group, and finally performing group-wise joint detection based on the collected information. More particularly, on group level, the joint detection is preferably performed based on the collected soft complex signal information associated with the considered group and a complex channel gain sub-matrix related to the receiving nodes of the group and the relevant transmitting nodes. The rationale is that interference only has a limited meaning at very far distances, and hence it makes little sense to distribute soft baseband information outside a rather local neighborhood.

In a truly distributed realization, adjacent receiving nodes or base stations exchange soft complex signal information with each other, thus forming at least partially overlapping groups for distributed collection of information, detection and subsequent decoding in each base station. Alternatively, the task of collecting soft complex information and performing joint detection and optionally also decoding may be assigned to a signal processing node that is associated with the group. Such a signal processing node may of course be a designated base station that belongs to the corresponding group.

In order to avoid multiple copies of the same decoded information to egress the network, decoded information may be transported to a (hard) combining point, where higher layer protocols such as ARQ (Automatic Repeat ReQuest) can be handled The performance of the distributed approach will be asymptotically close to the centralized multi-sensor processing even for relatively small groups involving just a few base stations, and also means that soft information only have to be transported within a local neighborhood. Shorter transport distances in the transport network generally means reduced costs for the operators.

The technology disclosed herein also provides a procedure for performing iterative detection of signal information based on distributed successive interference cancellation.

It has also been recognized that the amount of information that need to be transported over the transport network can be significantly reduced by compressing soft complex signal information before it is transported over the transport network and subsequently de-compressing the compressed soft complex information so that it can be fully exploited in the detection and decoding process.

The technology disclosed herein offers the following advantages:

Improved network performance;

Optimal formulation for uplink signal processing in a digital cellular network;

More optimal exploitation of signals from multiple base stations;

Alternatives for reducing the costs for transporting soft complex signal information (distributed approach and/or compression);

Integrated interference cancellation in the uplink signal processing; and

Reduced transmit power consumption, since transmit power can be controlled with reference to the noise floor (as interference is cancelled to a large extent).

Other advantages offered by the present technology disclosed herein will be appreciated upon reading of the below description of the example embodiments.

BRIEF DESCRIPTION OF THE DRAWINGS

The technology disclosed herein, together with further objects and advantages thereof, will be best understood by reference to the following description taken together with the accompanying drawings, in which.

DETAILED DESCRIPTION

Figure 1:
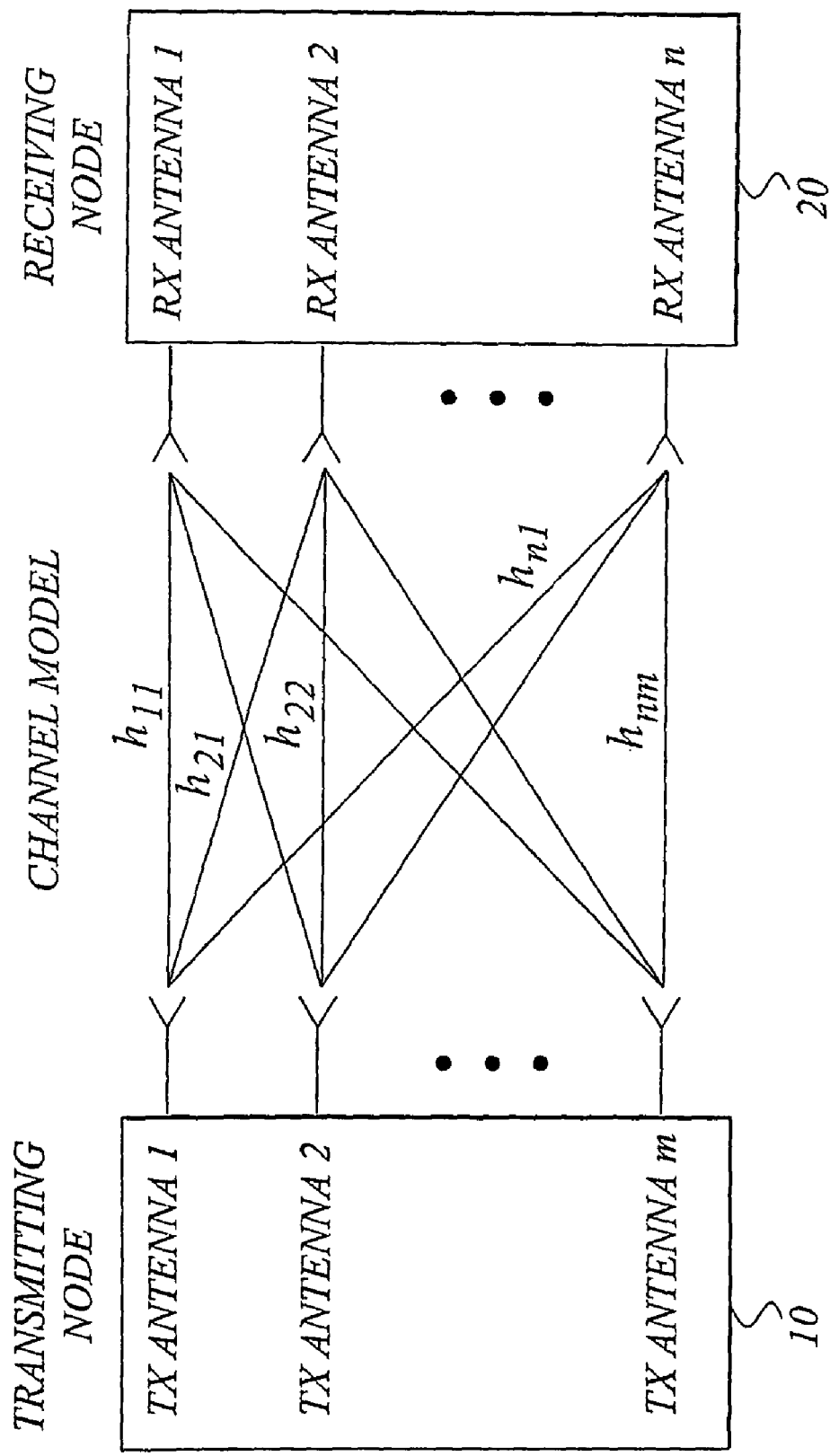
FIG. 1 is a schematic diagram illustrating an example of a classical MIMO system.
Figure 2:
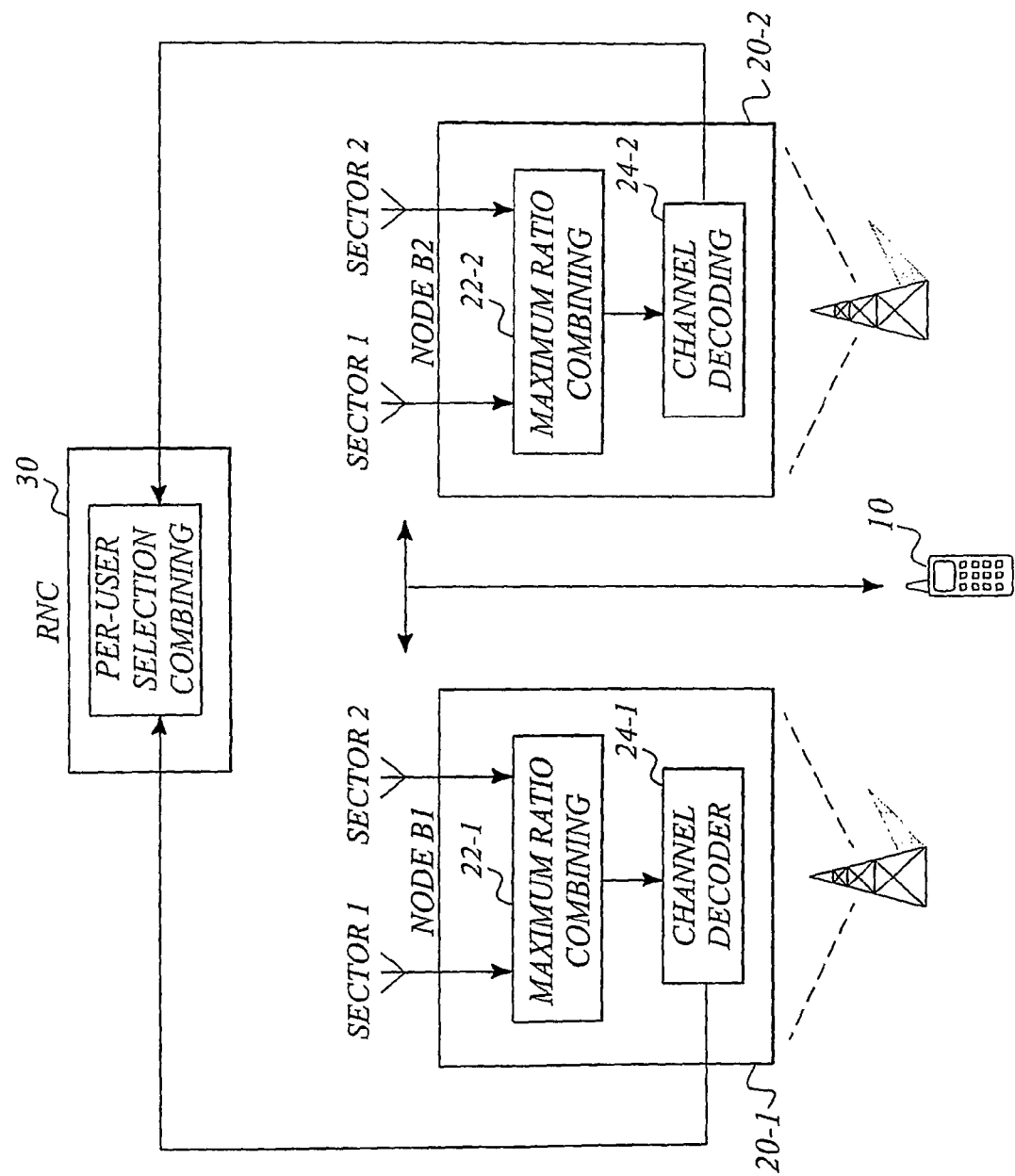
FIG. 2 is a schematic diagram illustrating uplink diversity in a prior art WCDMA system.
Figure 3:
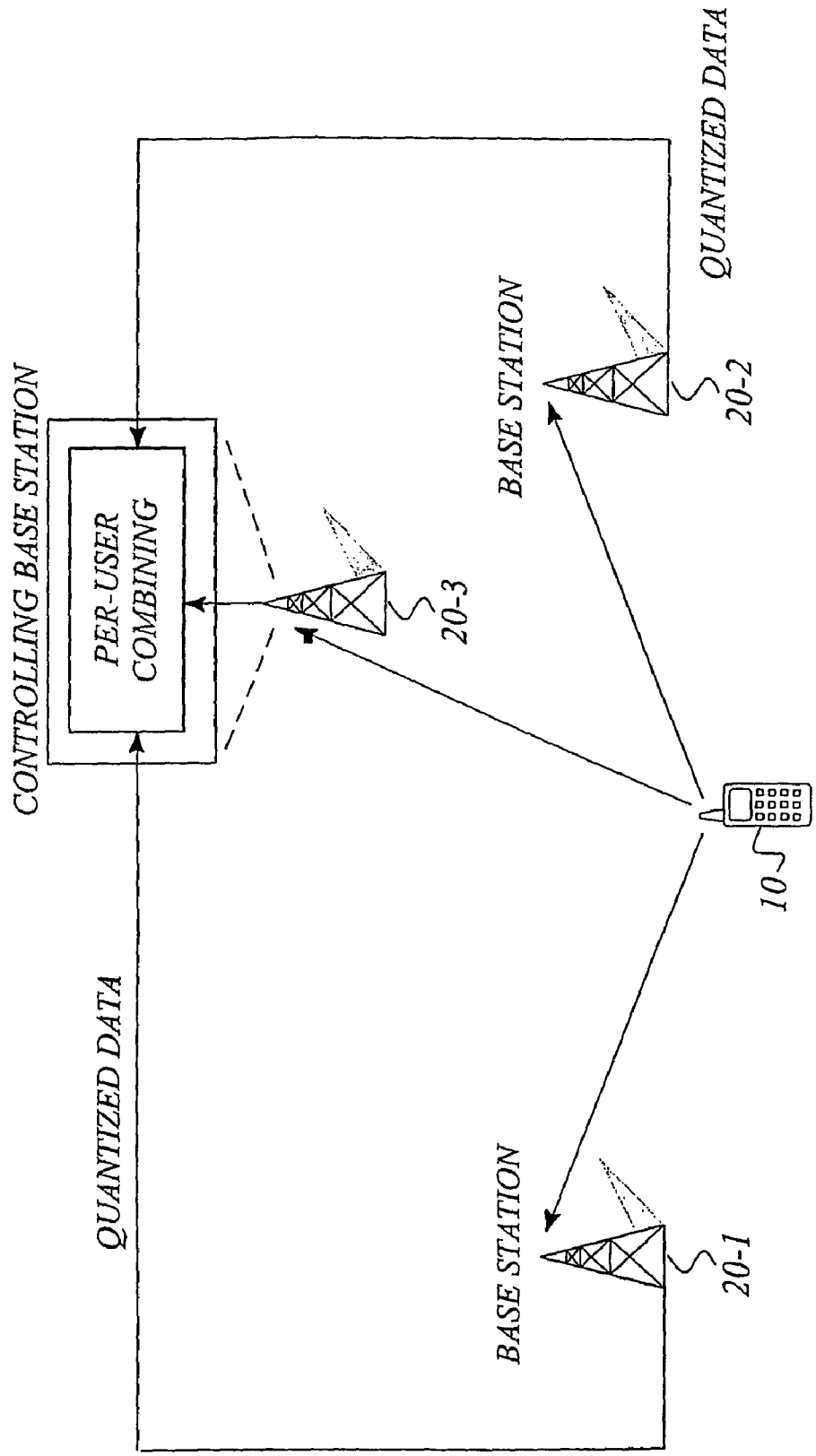
FIG. 3 is a schematic diagram illustrating a prior art uplink protocol based on the multiple-to-one relationship between base stations and mobile.

Throughout the drawings, the same reference characters will be used for corresponding or similar elements.

Figure 4:
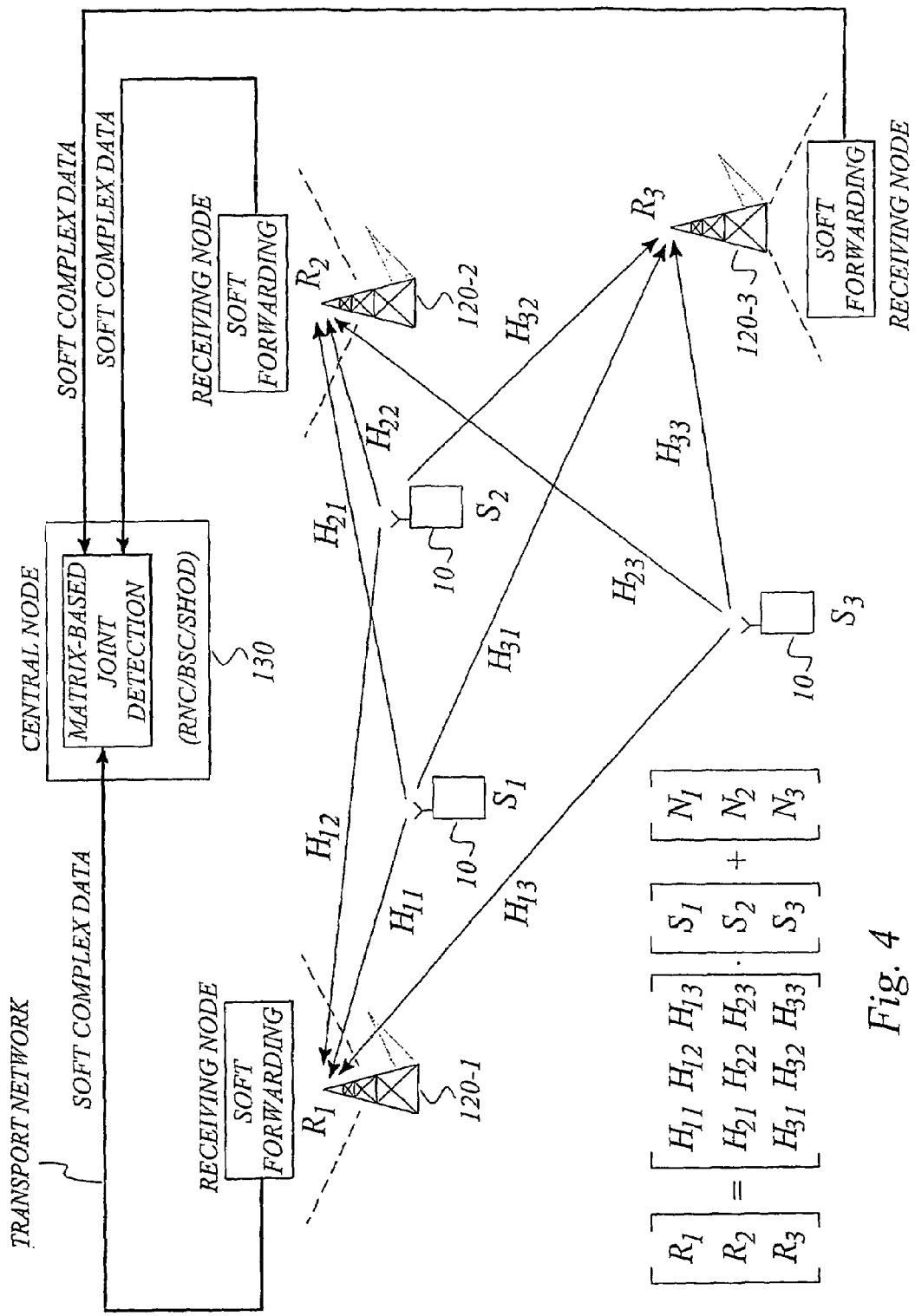
FIG. 4 is a schematic diagram illustrating an example of a centralized architecture and signal processing approach according to a preferred example embodiment.

FIG. 4 is a schematic diagram illustrating an example of a centralized system architecture and signal processing approach according to a preferred example embodiment. The network comprises a plurality of receiving nodes 120-1, 120-2, 120-3 such as base stations and a plurality of transmitting nodes 10 such as mobile terminals in a wireless network. Each receiving node 120 converts a superposition of signals received from a plurality of transmitting nodes 10 to produce soft complex signal information, and forwards soft complex signal information to a central node 130, typically over a transport network. The central node 130 may be a dedicated network node or implemented in an RNC (Radio Network Controller), BSC (Base Station Controller) or SHOD (Soft Handover Device). The central node 130 jointly detects signal information from the plurality of transmitting nodes based the collected soft signal information, and typically performs subsequent decoding, such as error correction decoding and/or source decoding, based on the detected signal information.

The term detection shall however be interpreted in a broad sense. Detection can take place on bit level, symbol level or on sequences of bits or symbols. Detection may take place on coded information or on information bits. The former means that decoding is generally performed on a per-user basis after detection, whereas the latter means that the decoding is integrated and then performed on multiple users. As will be appreciated below, the technology disclosed herein can also be implemented with successive or parallel interference cancellation.

The main benefit of this approach over other state-of-the-art techniques is that it enables/offers the optimal formulation for uplink signal processing, especially if all nodes in the wireless network are under consideration in a centralized approach. Instead of per-user combining, the technology disclosed herein -provides joint detection of a plurality of transmitting nodes or mobiles. The technology disclosed herein does not treat interference from other transmitting nodes as unstructured noise, in clear contrast to cellular systems of today. In effect, the signal processing approach suggested by the technology disclosed herein rather strives to cancel such interference.

The optimal formulation for joint detection on the "uplink", assuming M transmitting nodes and N receiving nodes, is preferably written in the frequency domain as:

$$\begin{bmatrix} R_1 \\ \vdots \\ R_N \end{bmatrix} = \begin{bmatrix} H_{11} & \cdots & H_{1M} \\ \vdots & \ddots & \vdots \\ H_{N1} & \cdots & H_{NM} \end{bmatrix} \cdot \begin{bmatrix} S_1 \\ \vdots \\ S_M \end{bmatrix} + \begin{bmatrix} N_1 \\ \vdots \\ N_N \end{bmatrix}$$

where $R_i$ represents the soft complex information from receiving node i, $H_{ij}$ represents a complex estimate (including fading and phase shift information) of the channel from transmitting node j to receiving node i, $S_j$ represents the signal transmitted from transmitting node j and $N_i$ is a representation of white complex Gaussian channel noise associated with receiving node j. In the following, it will be assumed that the complex channel response estimate $H_{ij}$ is represented by the complex channel gain from transmitting node j to receiving node i. The frequency domain representation is primarily suitable for OFDMA (Orthogonal Frequency Division Multiple Access), where each subcarrier can be treated according to the formulation above. However, the invention is not limited to frequency domain handling of joint detection of multiple signals, but can also be accomplished in the time-domain, yet generally with increased complexity when significant inter symbol interference (ISI) exist. The time domain signal is somewhat more complicated, when inter symbol interference exist, but may then be written as:

$$R_n(v) = \sum_{m=1}^{M} H_{nm} * S_m + N_n(v),$$

$$n = 1, \ldots, N,$$

where v is a time index (e.g. assuming sampling with the same rate as the symbol rate).

The former frequency domain formulation for uplink signal processing expression may simply be expressed as:

$$R = H \cdot S + N,$$

where R is a vector representation of the soft complex information, H is a N by M complex channel gain matrix, S is a vector representation of the transmitted signals and N is a vector representation of white complex Gaussian noise.

In practice, an estimate $\hat{H}$ of the complex channel gain matrix may be determined by explicit channel estimation, and the transmitted signals are then detected based on the determined channel matrix, using any general detection algorithm such as Zero Forcing (ZF), Maximum Likelihood Detection-Multi-User Detection (MLD-MUD) and Linear Minimum Mean Squared Error (LMMSE).

For Zero Forcing (ZF) detection, an estimate $\hat{S}$ of the transmitted signal vector can be found as:

$$\hat{S} = \hat{H}^{-1} \cdot R.$$

While using zero forcing equalizing on a system wide channel matrix may lead to noise amplification, it should be understood that this may be compensated for by a power control strategy that takes such factors into account.

For Maximum Likelihood Detection-Multi-User Detection (MLD-MUD), an estimate $\hat{S}$ of the transmitted signal vector can be found as:

$$\hat{S} = \arg\min_{\forall \tilde{S}} \left( \| R - H \cdot \tilde{S} \|^2 \right)$$

where $\tilde{S}$ is a hypothesis of the vector of transmitted signals. Each element in the vector is generally taken from a modulation alphabet. However, the hypothesis $\tilde{S}$ can be extended such that each element in $\tilde{S}$ is a sequence of coded information (a codeword). It is then the task not just to find the most likely transmitted symbols, but rather to find the most likely transmitted sequences. While this is generally very complex for long sequences, fairly short sequences should be possible to handle. In the relation above, the norm is determined over the entire sequence, i.e. a search for the valid codewords that minimized the residual error energy. Alternatively, advances in multi-user decoding structures employing one or more antennas can be integrated in the future. Possible forward error correction coding schemes for the coded sequences are, but not limited to, block codes, Trellis codes, Turbo codes and so forth.

Moreover, different combinations of complex channel gain matrix and symbol hypothesis vector may be tested to find an optimal symbol hypothesis vector that then defines the detected signal information. This means that we can tune both the complex channel gain matrix and the hypothesis vector of the transmitted signals until an optimal combination is found. By way of example, for MLD-MUD detection, this can be expressed in the following way:

$$\arg\min_{\forall \tilde{S}, \forall \tilde{H}} \left( \| R - \tilde{H} \cdot \tilde{S} \|^2 \right).$$

In a sense, this means that the channel estimation forms part of the joint detection process. If sequences are detected, the channel matrix can also be allowed to vary slowly over the sequence duration.

The collected soft signal information generally retains phase and amplitude information from multiple receiving nodes/base stations. Normally, each receiving node/base station converts the received superposition of signals into digitized soft baseband signals represented by complex samples. The complex samples can always be represented by a real and imaginary component, or equivalently, by amplitude and phase. Soft information generally has a higher information content than the finally detected or decoded information, and is usually represented by multiple (often binary) digits per signal component. If desired, the soft information may include so-called probability or reliability information, such as received power level or other information indicating the reliability of the information.

Figure 5:
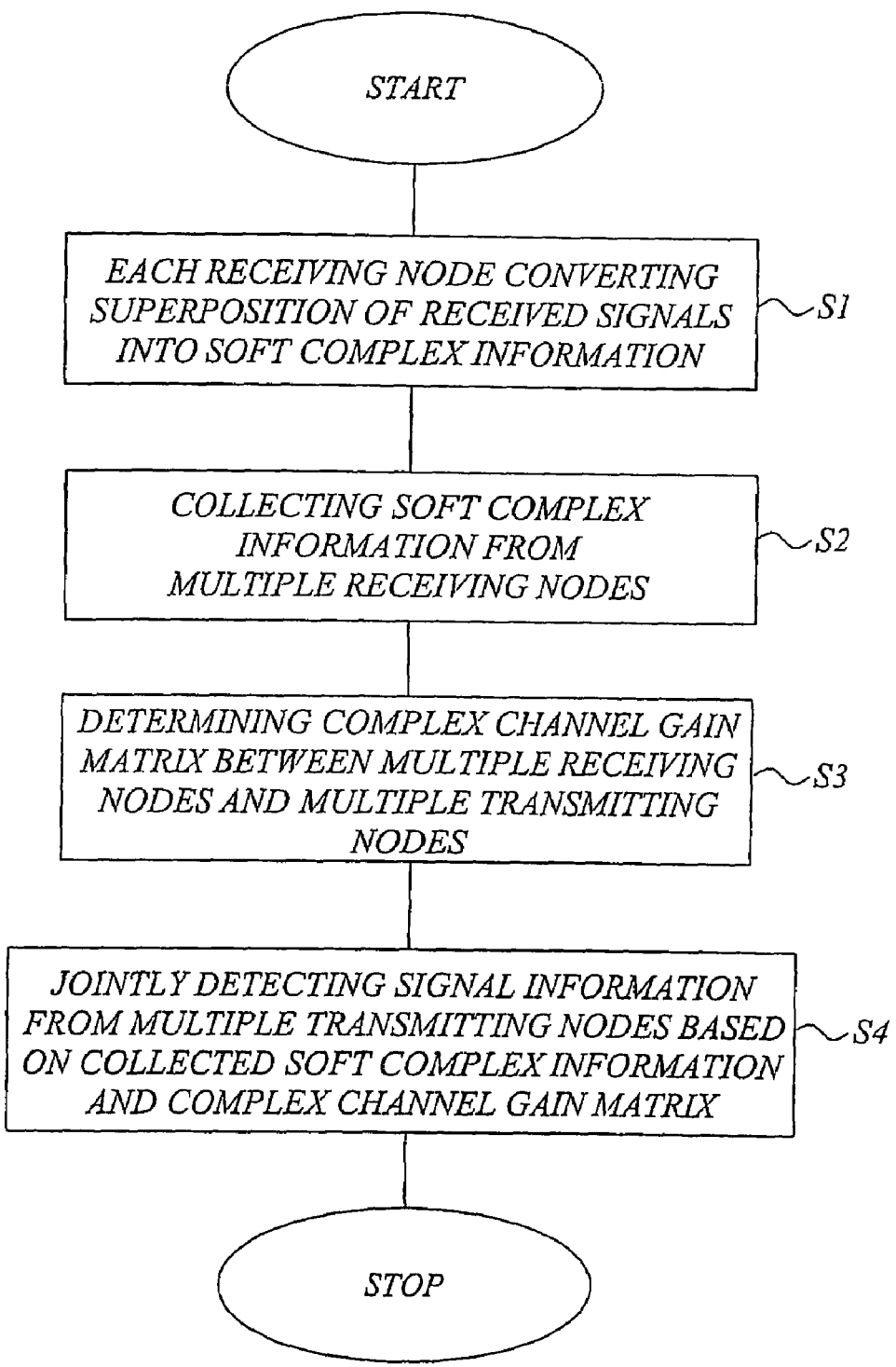
FIG. 5 is a schematic flow diagram illustrating a method according to a preferred example embodiment.

The overall flow of an exemplary multi-sensor processing procedure for multi-user detection according to a preferred example embodiment will now be summarized with reference to FIG. 5. In act S1, each of a number of receiving nodes (base stations) converts a superposition of received signals into soft complex information, such as digitized complex baseband signals. In act S2, complex baseband signals or similar soft signals are collected from the receiving nodes. In act S3, the complex channel gain matrix between the receiving nodes and the transmitting nodes is typically determined, e.g. by explicit channel estimation or based on the collected complex baseband information. In act S4, joint detection of signal information, such as symbols or sequences (code words), from multiple transmitting nodes is performed, preferably based on the collected soft complex information and the estimated complex channel gain matrix. As previously mentioned, acts S3 and S4 may be integrated and performed jointly.

Figure 6:
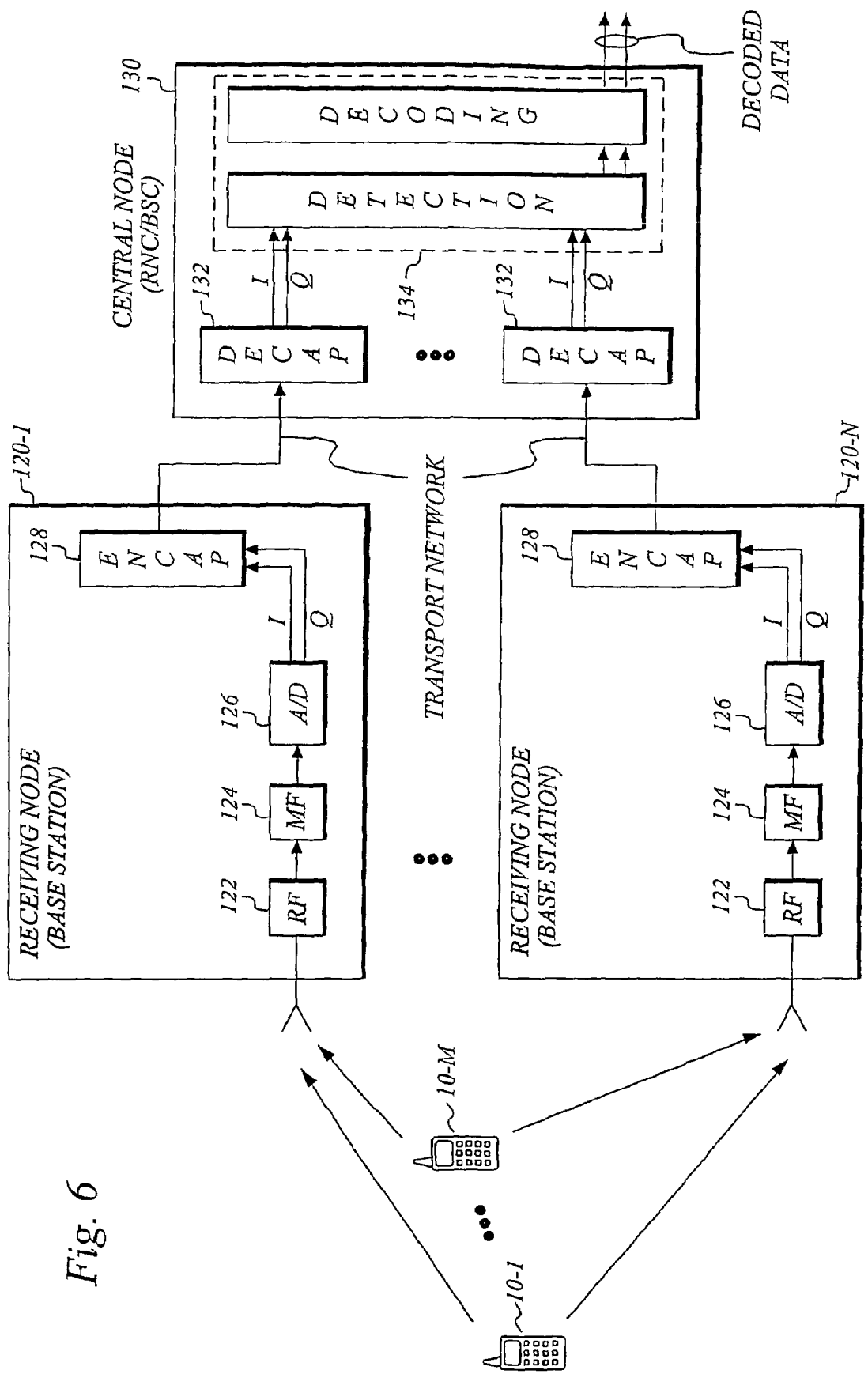
FIG. 6 is a schematic block diagram illustrating an example of a preferred realization for multi-sensor processing according to an example embodiment.

FIG. 6 is a schematic block diagram illustrating an example of a preferred realization for multi-sensor processing according to the technology disclosed herein, implemented in a cellular radio network. Consider a number of mobile terminals 10-1, . . . , 10-M, each of which transmits a radio signal representing digital information to a number of base stations 120-1, . . . , 120-N. Each base station typically includes traditional base station equipment, such as a radio frequency section (RF) 122, a medium frequency section (MF) 124 and an analog/digital converter (A/D) 126. Although the base station is illustrated as having a single receiving antenna, there is nothing that prevents the base station from using an advanced multi-antenna system. In this exemplary embodiment it is assumed that the received signals are quadrature amplitude modulated (QAM), for example 64 QAM. This means that the A/D converter 126 will produce a digital baseband signal including both in-phase (I) and quadrature-phase (Q) components, each with a resolution of, for example, 10-15 bits (fewer or more bits are possible). In this embodiment, these I and Q components represent soft information to be sent to a central decoding node 130, for example an RNC, BSC or SHOD. The soft information is forwarded to an encapsulating unit 128, which puts the information into packets suitable for transfer to the RNC/BSC 130 over a transport network. At the RNC/BSC 130, the soft information from the base stations 120-1, . . . , 120-N is received by one or more decapsulating units 132, which retrieve the soft information. The soft I and Q components from the base stations are then forwarded to a detection and decoding unit 134, which jointly detects the transmitted signals from the mobile terminals 10-1, . . . , 10-M and subsequently decodes the detected signals. Alternatively, as mentioned earlier, decoding may be performed as an integrated part of the overall joint detection process.

Figure 7:
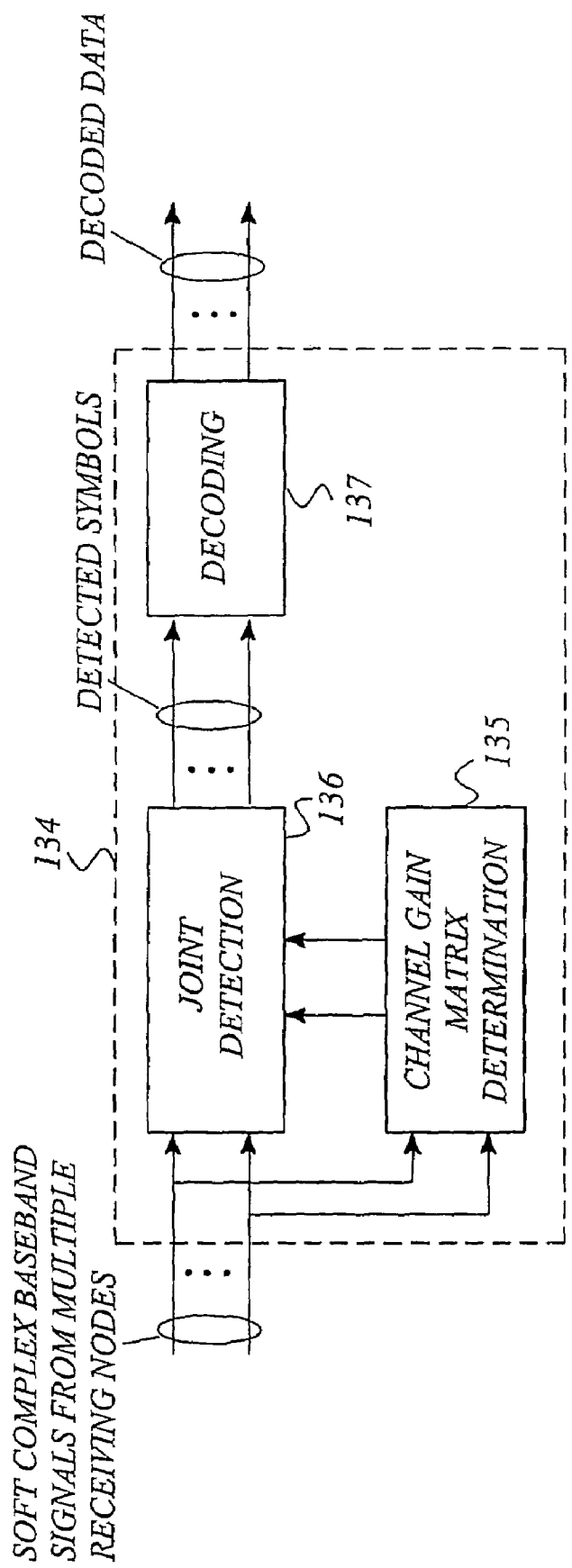
FIG. 7 is a schematic diagram illustrating an example of detection and decoding unit according to an exemplary example embodiment.

FIG. 7 is a schematic diagram illustrating an example of detection and decoding unit according to the technology disclosed herein. In this particular example, the detection and decoding unit 134 comprises a module 135 for determining a complex channel gain matrix, a joint detection module 136 and a decoding module 137. The detection and decoding unit 134 receives soft complex baseband signals from multiple receiving nodes such as base stations. For example, the complex soft baseband signals may include I and Q components (or other soft information indicative of reliability) from multiple base stations. The I and Q components are transferred to the channel gain matrix determination module 135 for estimating respective complex channel gain estimates over one or more samples (e.g. over an entire frame) by means of conventional channel estimation techniques. The complex channel gain estimates are normally determined simultaneously, per base station or for all base stations at once, in a search procedure. The estimated complex channel gain matrix is forwarded to the detection module 136, which based on this complex channel gain matrix and the soft I and Q components jointly detects symbol information from the mobile terminals. Alternatively, each base station determines respective complex channel estimates related to the transmitting mobile terminals, and sends channel estimation symbols in the soft information to the central node. More information on multi-user channel estimation techniques can be found, e.g. in references [9, 10]. Once detected, the retrieved symbols are transferred to the decoding module 137, which performs decoding such as channel decoding/error correction decoding and/or source decoding to generated decoded data. While multi-user detection may be performed on symbols and subsequent per-user decoding is performed, one may also perform multi-user detection on sequences equivalent to multi-user decoding. Performing decoding as an integrated part of the detection process implies that the detection module 136 may be configured for joint detection and decoding, and that a separate decoding unit 137 may be omitted.

Figure 8:
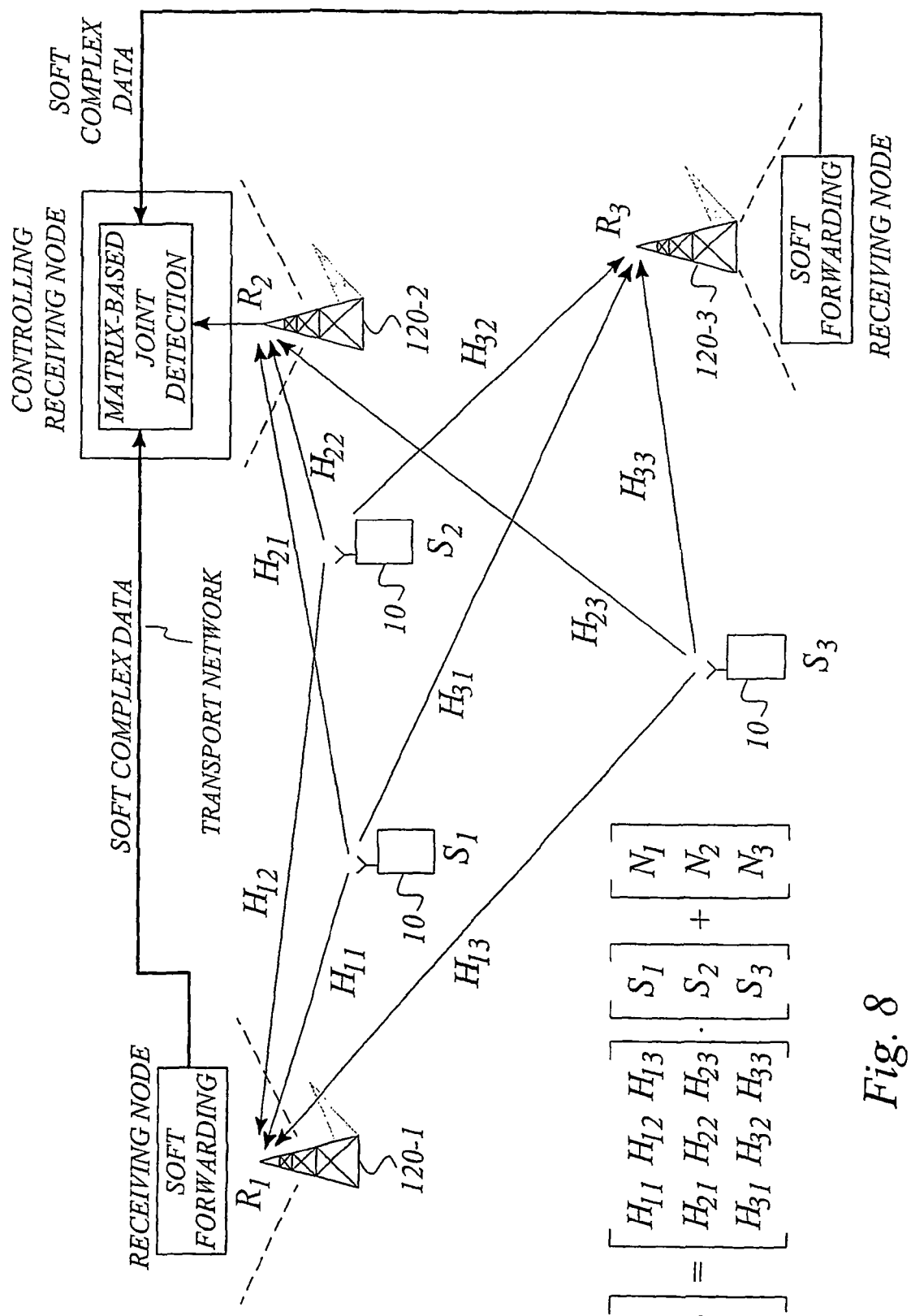
FIG. 8 is a schematic diagram illustrating an exemplary architecture and signal processing approach according to an alternative example embodiment.

FIG. 8 is a schematic diagram illustrating an exemplary architecture and signal processing approach according to an alternative example embodiment. In similarity to the example of FIG. 4, the network comprises a plurality of receiving nodes 120-1, 120-2, 120-3 such as base stations and a plurality of transmitting nodes 10 such as mobile terminals. Each receiving node 120 converts a superposition of signals received from a plurality of transmitting nodes 10 to produce soft complex signal information. In this embodiment, a number of receiving base stations 120-1 and 120-3 transfer soft complex signal information to a so-called controlling base station 120-2. The controlling base station, which can be regarded as a "super base station", takes its own soft complex information and combines it with the soft complex information received from the other base stations in a joint detection process to detect the signal information from the transmitting mobile terminals.

In general, the receiving nodes are normally separate radio base stations. It should however be understood that it is possible that one or more receiving nodes are remote radio units in a distributed radio base station system, e.g. based on the concept of fiber-to-the-antenna (FTTA). In the latter case, analog/digital RF signals or IF signals may be distributed from the remote units to the main unit of the distributed base station system, in which digital baseband information from several radio units may be extracted. The extracted digital baseband information from one or several main units may then be transferred to a central node such as the RNC node for signal detection and decoding in similarity to the examples of FIGS. 4 and 6. Alternatively, however, the main unit of such a distributed base station system is responsible for signal detection and decoding, in similarity to the controlling base station in the example of FIG. 8.

In the centralized approach, soft complex signal information is collected from the considered receiving nodes and processed in a central node. Although optimal from a signal processing point of view, the centralized multi-sensor processing approach may lead to somewhat higher transport costs for the network operators because of the large amounts of information that may have to be transported relatively long distances.

Therefore, the technology disclosed herein also proposes a distributed approach to the novel multi-sensor processing scheme. The distributed approach is based on partitioning receiving nodes into multiple groups, and collecting soft complex signal information associated with the receiving nodes of each group, and finally performing group-wise joint detection based on the collected information. The receiving nodes may be partitioned into groups based on e.g. geographical position or correlation characteristics. More particularly, on group level, the joint detection is preferably performed based on the collected soft complex signal information associated with the considered group and a complex channel representation such as a complex channel gain matrix related to the receiving nodes of the group and the relevant transmitting nodes. The rationale behind this distributed approach is that interference only has a limited meaning at very far distances, and hence it makes little sense to distribute soft information outside a rather local neighborhood.

The problem associated with the transfer of large amounts of signal data over the transport network has been analyzed in reference [8], in the context of per-user combining. However, the solution proposed in reference [8] implies that each base station should decode the signal received from a mobile and transfer a decoded signal to the central exchange node, where the decoded signals are re-encoded, combined and finally decoded. The technology disclosed herein, on the other hand, suggests a solution to this type of problem based on distributed joint multi-user detection.

Figure 9:
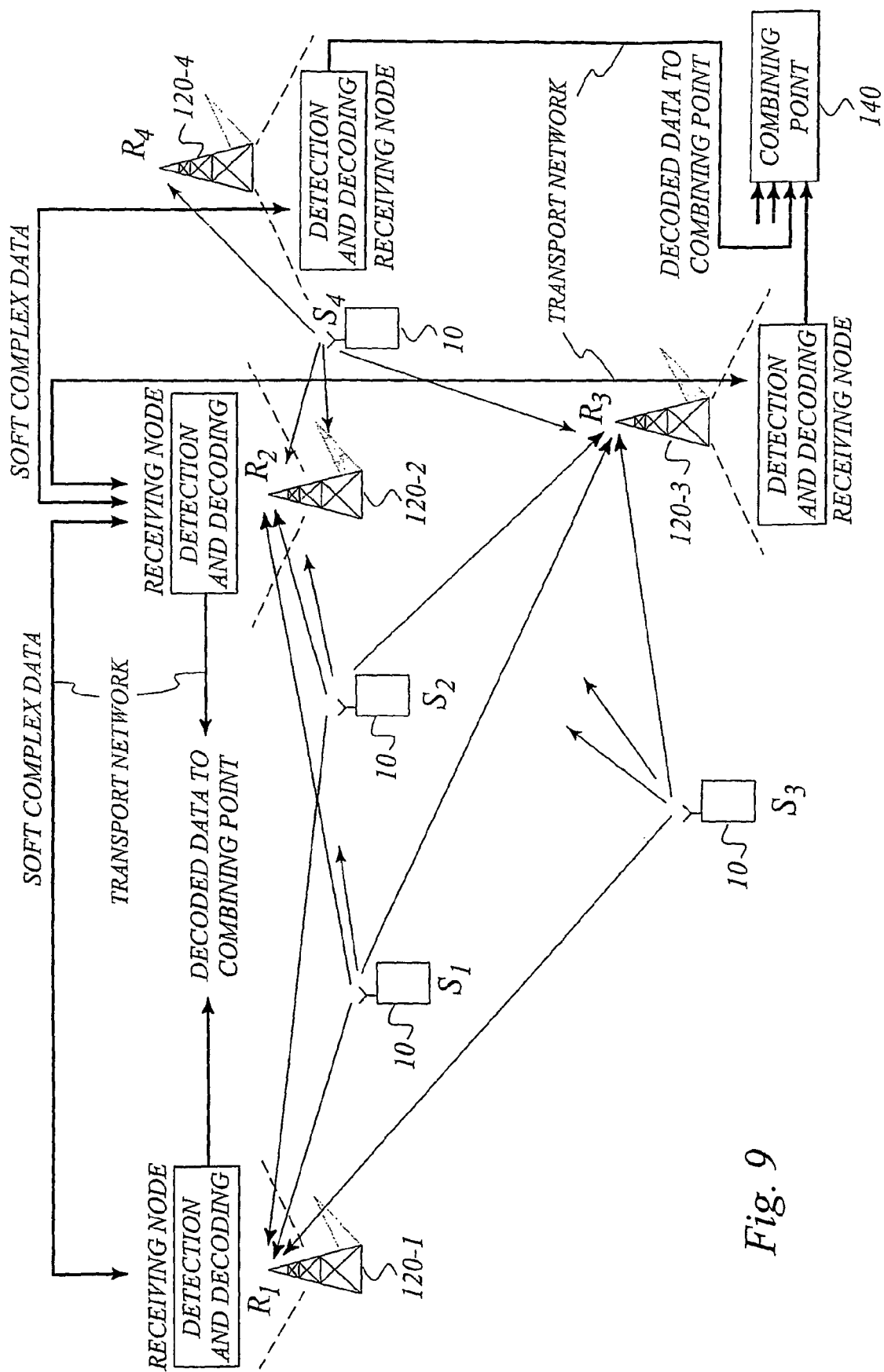
FIG. 9 is a schematic diagram illustrating an example of a distributed architecture and signal processing approach according to a preferred example embodiment.

In a truly distributed realization, adjacent receiving nodes or base stations exchange soft complex signal information with each other, thus forming at least partially overlapping groups for distributed collection of information, detection and decoding in each base station, as schematically illustrated in FIG. 9. The network of FIG. 9 comprises a plurality of receiving nodes 120-1, 120-2, 120-3, 120-4 such as base stations and a plurality of transmitting nodes 10 such as mobile terminals. Each base station 120 converts a superposition of signals received from a plurality of transmitting nodes 10 to produce soft complex signal information. In this example, the base stations 120-1, 120-2, 120-3, 120-4 are partitioned into groups such that adjacent base stations form a number of at least partially overlapping groups. The base stations within a group exchange soft complex signal information with each other, and each base station then performs joint detection and decoding of information from a number of mobile terminals 10. The decoding process may be performed separately, or as an integrated part of the detection process (sequence detection).

With the exchange of soft complex information illustrated in FIG. 9, the following exemplary formulation for uplink signal processing would be possible:

$$\begin{bmatrix} R_1 \\ R_2 \end{bmatrix} = \begin{bmatrix} H_{11} & H_{12} & H_{13} & H_{14} \\ H_{21} & H_{22} & H_{23} & H_{24} \end{bmatrix} \cdot \begin{bmatrix} S_1 \\ S_2 \\ S_3 \\ S_4 \end{bmatrix} + \begin{bmatrix} N_1 \\ N_2 \end{bmatrix} \text{ in base station 120-1,}$$

$$\begin{bmatrix} R_1 \\ R_2 \\ R_3 \\ R_4 \end{bmatrix} = \begin{bmatrix} H_{11} & H_{12} & H_{13} & H_{14} \\ H_{21} & H_{22} & H_{23} & H_{24} \\ H_{31} & H_{32} & H_{33} & H_{34} \\ H_{41} & H_{42} & H_{43} & H_{44} \end{bmatrix} \cdot \begin{bmatrix} S_1 \\ S_2 \\ S_3 \\ S_4 \end{bmatrix} + \begin{bmatrix} N_1 \\ N_2 \\ N_3 \\ N_4 \end{bmatrix} \text{ in base station 120-2,}$$

$$\begin{bmatrix} R_2 \\ R_3 \end{bmatrix} = \begin{bmatrix} H_{21} & H_{22} & H_{23} & H_{24} \\ H_{31} & H_{32} & H_{33} & H_{34} \end{bmatrix} \cdot \begin{bmatrix} S_1 \\ S_2 \\ S_3 \\ S_4 \end{bmatrix} + \begin{bmatrix} N_2 \\ N_3 \end{bmatrix} \text{ in base station 120-3,}$$

and $$\begin{bmatrix} R_2 \\ R_4 \end{bmatrix} = \begin{bmatrix} H_{21} & H_{22} & H_{23} & H_{24} \\ H_{41} & H_{42} & H_{43} & H_{44} \end{bmatrix} \cdot \begin{bmatrix} S_1 \\ S_2 \\ S_3 \\ S_4 \end{bmatrix} + \begin{bmatrix} N_2 \\ N_4 \end{bmatrix} \text{ in base station 120-4.}$$

Based on the detected information, each base station may then perform decoding to generate decoded information, or alternatively, decoding is integrated into the joint detection process. In order to avoid multiple copies of the same decoded information to egress the network, decoded information may be transported from the base stations to a (hard) combining point 140 that combines the decoded information, e.g. by selection combining or majority combining. The combining point may be implemented in a base station, a BSC/RNC or even a floating signal processing agent that follows a mobile terminal as it migrates.

The performance of the distributed approach will be asymptotically close to the centralized multi-sensor processing even for relatively small groups involving just a few base stations, and also means that soft information only have to be transported within a local neighborhood. Shorter transport distances in the transport network generally means reduced costs for the operators.

Alternatively, the task of collecting soft complex information and performing joint detection and optionally also decoding may be assigned to a signal processing node that is associated with the group. Such a signal processing node may of course be a designated base station that belongs to the corresponding group.

Figure 10:
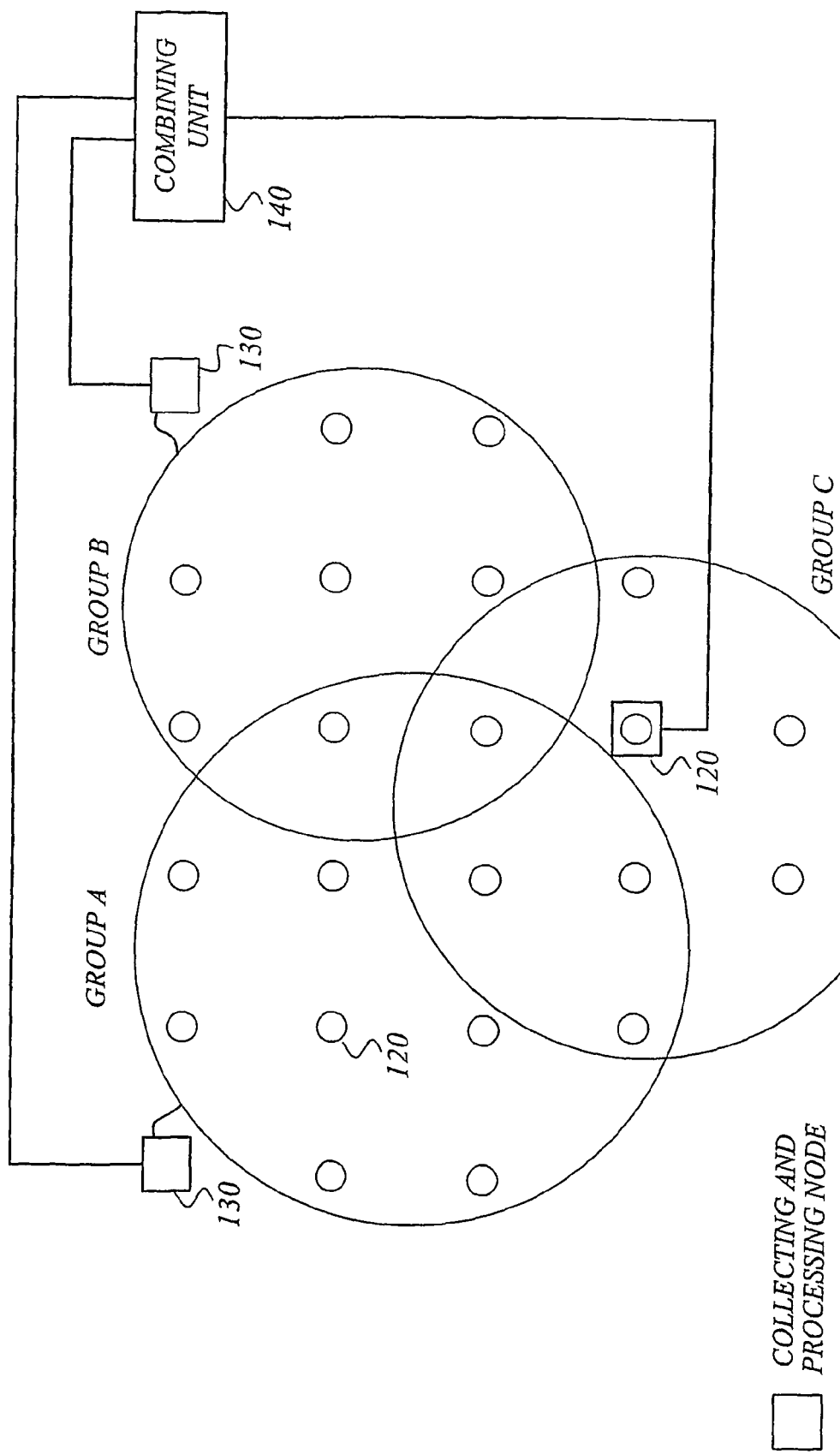
FIG. 10 illustrates an example of a distributed architecture and signal processing approach according to an alternative example embodiment.

FIG. 10 illustrates an example of a distributed architecture and signal processing approach according to an alternative example embodiment, with somewhat looser requirements on how the receiving nodes 120 (e.g. base stations) may be partitioned into groups. The groups may include not only immediate neighbors, but also more distant neighbors. Still however, some form of locality is desired so that soft information does not have to be exchanged/distributed from nodes situated very far from each. In the example of FIG. 10, three main groups A, B and C are formed. As mentioned above, some groups, here group A and group B, may be associated with a designated signal processing node 130 that is responsible for collecting soft complex information and performing the required signal processing. In group B, a designated receiving node 120 is responsible for collecting soft complex information and performing signal processing. Decoded data from the three groups may be distributed to a so-called combining unit 140, which "combines" multiple copies of the same decoded data, thus performing some form of duplicate filtering. Higher layer protocols such as ARQ may be used after duplicate filtering.

If it is not possible to directly detect all the relevant signal information from the considered mobile terminals, the technology disclosed herein provides a procedure for performing iterative detection of signal information based on distributed successive cancellation of currently detected signal information from soft complex signal information.

Figure 11:
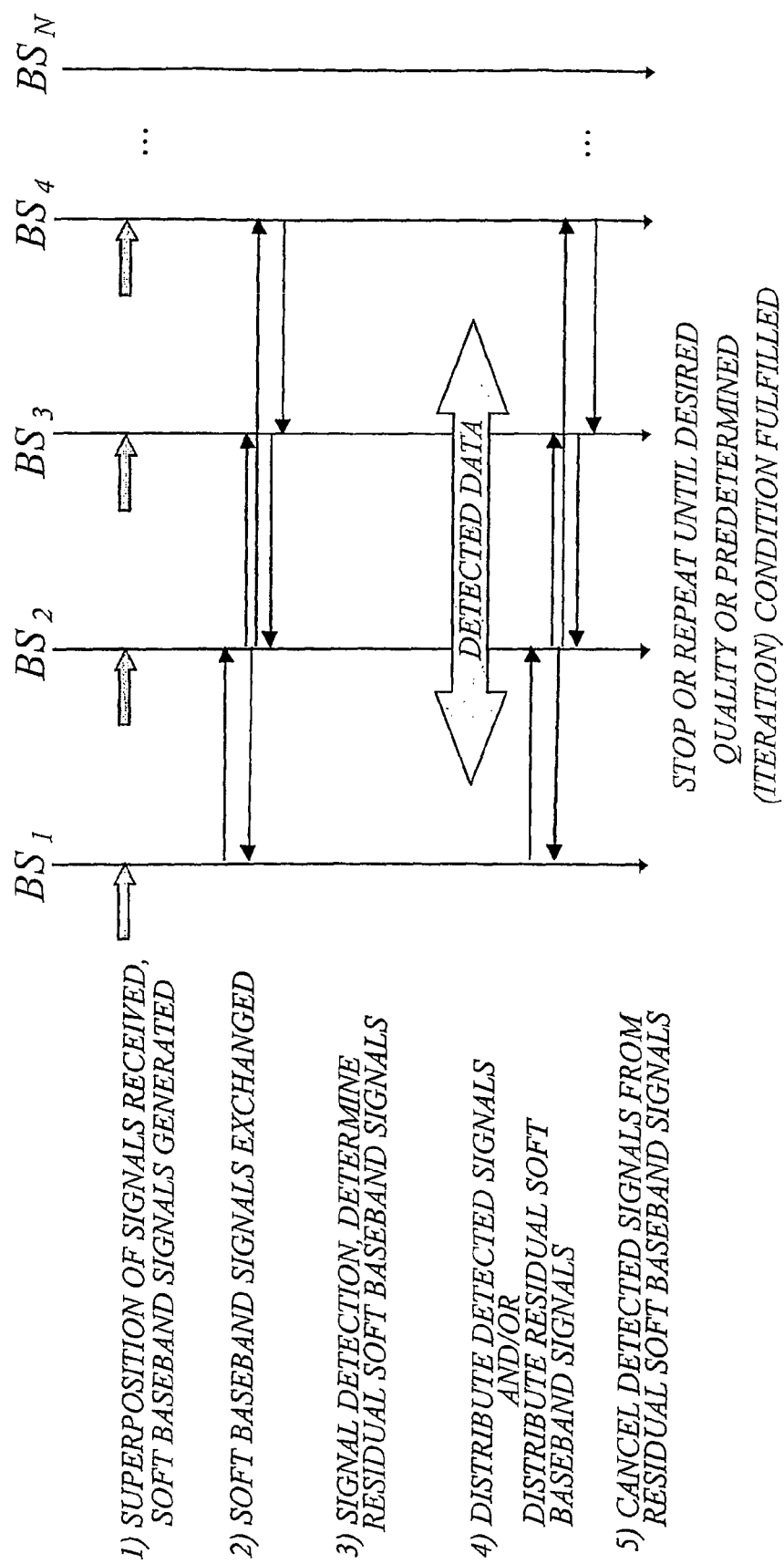
FIG. 11 is a schematic diagram illustrating an example of the signal exchange in a distributed realization with optional successive interference cancellation according to a preferred example embodiment.

FIG. 11 is a schematic diagram illustrating an example of the signal exchange in a distributed realization with optional successive interference cancellation according to a preferred example embodiment.

1. Each base station/cell receives a superposition of signals from several mobile terminals, and generates corresponding soft complex baseband information or other soft complex information.
2. Each base station/cell distributes soft complex baseband information to one or more adjacent base stations/cells.
3. Each base station/cell jointly detects transmitted signals from multiple mobile terminals by exploiting the exchanged soft baseband information.

An optional extension to the above procedure involves the following steps:

4. Distribute detected signals and/or residual soft baseband signals (where detected signals have been cancelled) to adjacent base stations/cells.
5. Cancel detected signals from the residual baseband signals. Normally, each base station/cell cancels received detected signal information not previously available to the base station from its residual soft baseband signal.

Repeat the successive cancellation until all (desirable) signals are detected, or until a predetermined iteration limit is reached.

Alternatively, in a general approach, each base station may first try to detect signal information based on its own soft complex signal information before sending out residual soft baseband information where the detected information is cancelled. In other words, if a base station detects signal information from some of the mobile terminals, it may determine residual soft complex signal information by cancellation of the currently detected signal information. The collected soft complex information, including residual soft information, may then be used as a basis for detection until the signal information from all the considered mobile terminals have been detected.

The whole iterative detection process may be seen as a range of detectors operating in parallel and exploiting distributed successive interference cancellation.

It has also been recognized that the amount of information that need to be transported over the transport network can be significantly reduced by compressing soft complex signal information before it is transported over the transport network and subsequently de-compressing the compressed soft complex information so that it can be used in the detection and decoding process.

Figure 12:
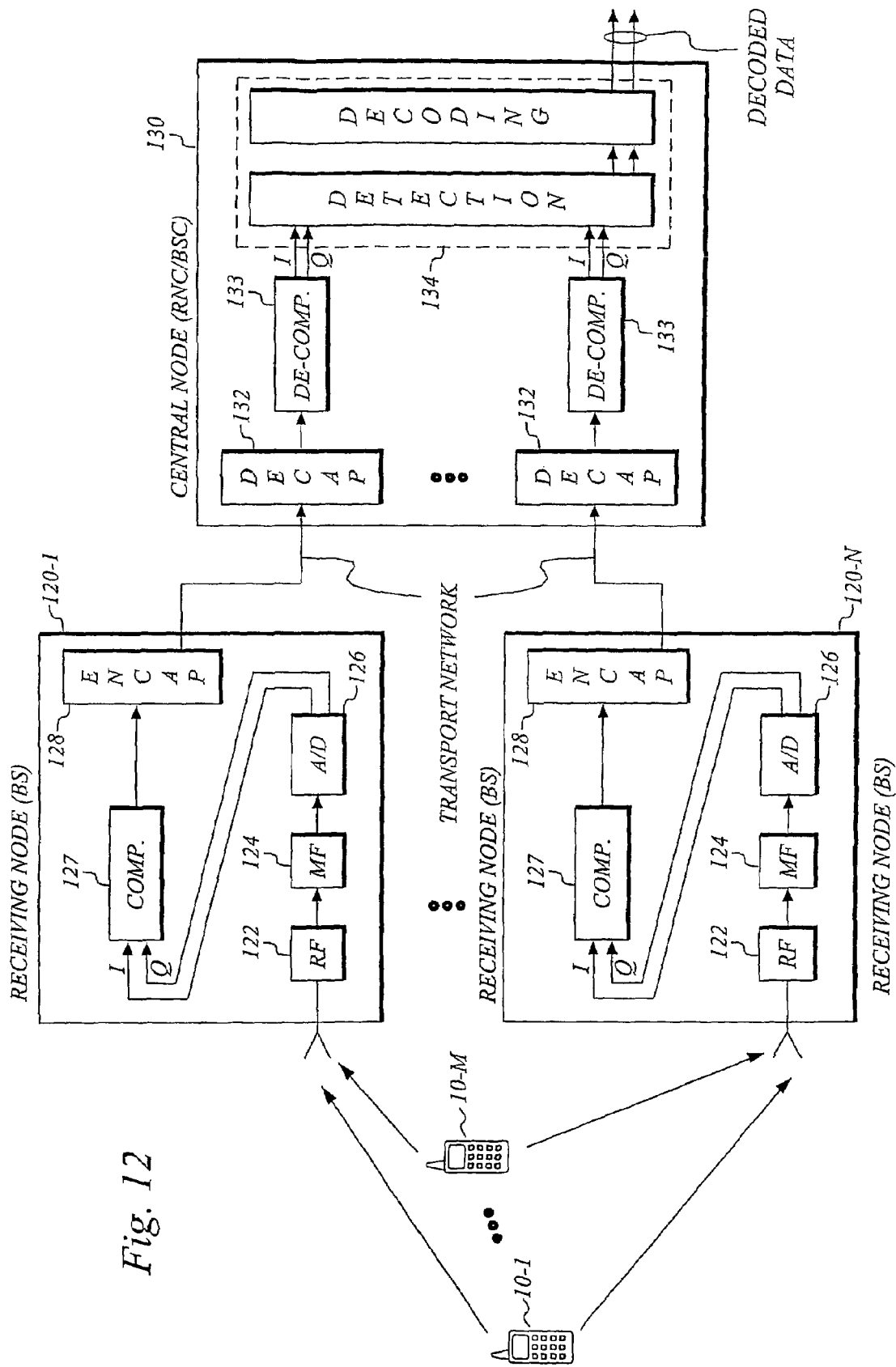
FIG. 12 is a schematic block diagram illustrating a realization of multi-sensor processing including compression and de-compression of soft information according to an exemplary example embodiment.

FIG. 12 is a schematic block diagram illustrating a realization of multi-sensor processing including compression and de-compression of soft information according to an exemplary embodiment. The block diagram of FIG. 12 is similar to that of FIG. 6, except for the compression on the base station side and the corresponding de-compression on the detection and decoding side. By way of example, assume once again that the A/D converter 126 produces a digital baseband signal including both in-phase (I) and quadrature-phase (Q) components. Before these I and Q components are sent to the central RNC/BSC node, they are forwarded to a compressor 127, which compresses the soft information. The compressed soft information is forwarded to an encapsulating unit 128, which puts the information into packets suitable for transfer to the RNC/BSC 130 over the transport network. At the RNC/BSC 130, the compressed information from the base stations 120-1, ..., 120-N is received by one or more decapsulating units 132, which retrieve the compressed soft information. This compressed soft information is de-compressed in a set of de-compressors 133, which at least approximately restore the I and Q components originally sent from the respective base stations. The restored I and Q components are then forwarded to the detection and decoding unit 134.

The compression is typically lossy to obtain highest possible compression. This means that the de-compressed soft information may not be exactly equal to the original soft information. Instead, it may represent an approximation of this information. The compression should, however, be such that the de-compressed soft information contains more information than the traditionally sent hard coded bits. It is also important that the compression retains phase and amplitude relations such that interference can be suppressed and signal-to-noise ratio maximized.

A suitable compression method would be vector quantization of the complex values represented by the I and Q components. This vector quantization may be performed on each I, Q pair. An alternative and more efficient approach is to group several I, Q pairs into a multi-dimensional vector with complex-valued components, and perform vector quantization of this multi-dimensional vector.

Vector quantization is a well known compression method that uses a table (often called a code book) of predetermined vectors. The quantization is accomplished by comparing each vector in the table with the vector to be quantized. The vector in the table with the smallest deviation from the desired vector is selected. However, instead of sending the selected vector itself, its table index is selected to represent the vector (this is where the compression is obtained). The de-compressing end stores the same table and retrieves the approximation vector by using the received index to look it up in the table.

Although this aspect of the technology disclosed herein is illustrated for a centralized architecture and signal processing approach, it is clear that each base station may be provided with a compressor as well as a de-compressor to support compression/de-compression of soft complex signal information also for distributed implementations.

Figure 13:
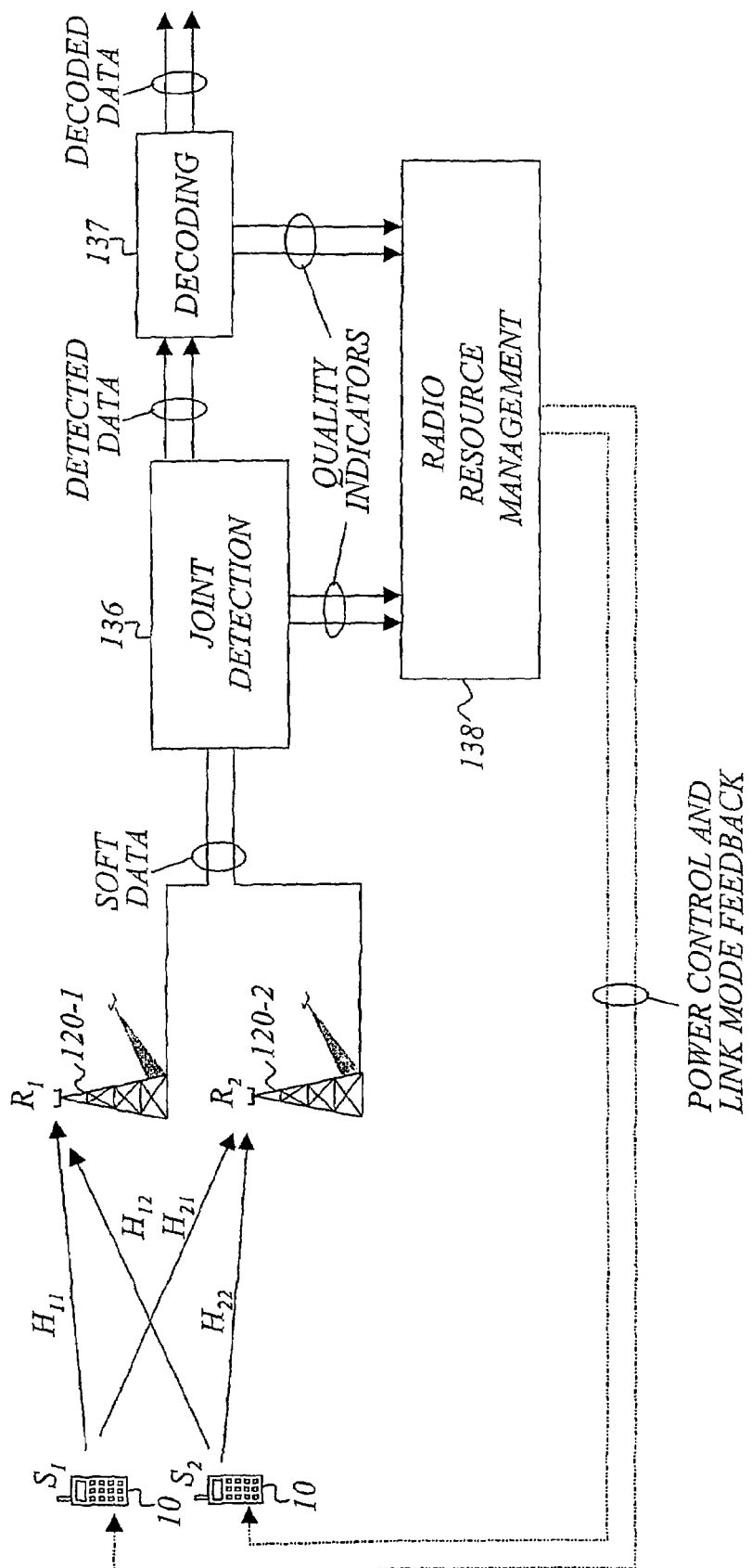
FIG. 13 illustrates power control and link mode feedback in a system according to an exemplary example embodiment.

For both centralized and distributed architectures, power control as well as link mode control (including modulation, coding and spreading) can be adjusted to take advantage of the new signal processing architecture. In doing that, power control may also operate between multiple base stations. FIG. 13 illustrates power control and link mode feedback in a system according to an exemplary embodiment. In a simple network, soft complex information is collected for joint detection and subsequent decoding. Various suitable quality indicators from the detection unit 136 and/or an optional separate decoding unit 137 may be transferred to a radio resource management unit 138 for suitable power control and/or link mode feedback to the mobile terminals 10. In traditional power control schemes, the power control policy is to exceed any interfering signal with some margin. However, as the technology disclosed herein strives to cancel interference by advanced multi-sensor processing, transmit power will rather be controlled with reference to the noise floor. This change in power control objective may have an impact on the power control protocol, where power control decisions are taken and power control PDUs are sent. The fact that power consumption is reduced, since transmit power can be controlled with reference to the noise floor, leads to even more efficient detection and decoding. This of course leads to even better power control settings, which in turn leads to even better interference cancellation and so on. Power control can be accomplished in several ways, e.g. through an inner power control loop that compares instantaneous signal quality, such as signal to interference (and noise) ratio with a target value, $\Gamma$. By adapting transmit power rapidly, any degradation in signal quality due to fast fading can be counteracted. Power control can also be performed on a slower basis with reference to an average power level. Outer loop power control may derive its input from packet error rate or block error rate figures, and adjust the signal to interference ratio target in response to fulfill desired performance criteria for each link. The power control can, similarly to existing cellular systems, operate in a distributed fashion, i.e. each link is individually controlled, or alternatively a partially or fully centralized method may be adopted.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] *Construction of Equivalent Scalar Channels for Orthogonal Space-Time Coding*, by Cheng Chang, Wei Wei.
[2] *Space-Time Coding*, by Shingwa G. Wong, Michael P. Fitz, Aug. 19, 2003
[3] U.S. Pat. No. 6,452,981, Sep. 17, 2002
[4] *W-CDMA Mobile Communications System*, edited by Keiji Tachikawa, Wiley & Sons, 2002, pp. 56-59, 66-73.
[5] *An Uplink Protocol Implementation in a Virtual Cellular Network*, by J. D. Bakker, R. Prasad
[6] *LMMSE Receivers performance under Non-Ideal Conditions*, by Lorenzo Mucchi, 2002.
[7] *Soft Detection and Decoding in Wideband CDMA Systems*, by Kimmo Kettunen, March 2003.
[8] U.S. Pat. No. 6,320,852, Nov. 20, 2001
[9] U.S. Pat. No. 6,445,342, Sep. 3, 2003
[10] U.S. Pat. No. 6,640,088, Oct. 28, 2003

The invention claimed is:

1. A system for detecting signal information in a wireless communication network having a number of nodes for communication, said system comprising:
   a plurality of receiving nodes, each configured for converting a superposition of signals received from a plurality of transmitting nodes to produce soft complex signal information;
   means for collecting soft complex signal information associated with said plurality of receiving nodes over a transport network;
   means for jointly detecting said signal information from at least a subset of said plurality of transmitting nodes based on the collected soft complex signal information;
   means for providing quality indicators related to said joint detecting and/or subsequent decoding to a radio resource management unit for power control and/or link mode feedback to transmitting nodes.

2. The system according to claim 1, wherein said system comprises said radio resource management unit, and said radio resource management unit is configured for providing power control feedback to transmitting nodes for controlling transmit power with reference to a noise floor.

3. The system according to claim 1, wherein said means for jointly detecting is configured to operate based on the collected soft complex signal information in combination with a complex channel representation related to said plurality of receiving nodes and said plurality of transmitting nodes.

4. The system according to claim 3, wherein said complex channel representation is a complex channel gain matrix.

5. The system according to claim 1, wherein said soft complex signal information retains phase and amplitude information.

6. The system according to claim 1, wherein said soft complex signal information is collected from said plurality of receiving nodes in a central node, and said means for jointly detecting signal information is implemented in the central node.

7. The system according to claim 1, wherein said wireless communication network is a cellular network, and said plurality of receiving nodes are base stations and said plurality of transmitting nodes are mobile stations.

8. The system according to claim 1, wherein said plurality of receiving nodes are partitioned into multiple groups, and said means for collecting soft complex signal information comprises means for collecting, for each group, soft complex signal information associated with the receiving nodes of the group, and said means for jointly detecting comprises means for performing, for each group, joint detection based on the collected soft complex signal information associated with the group.

9. The system according to claim 8, wherein at least two of said multiple groups are partially overlapping.

10. The system according to claim 8, wherein said means for performing, for each group, joint detection is implemented in a signal processing node associated with the group of receiving nodes.

11. The system according to claim 10, wherein said signal processing node is a designated receiving node that belongs to the corresponding group.

12. The system according to claim 1, further comprising:
means for compressing soft complex signal information on the receiving node side;
means for collecting the compressed soft complex signal information over a transport network; and
means for decompressing the compressed soft complex information for input of decompressed soft complex information to said means for jointly detecting signal information.

13. A network node in a wireless communication network, said network node comprising:
means for collecting, from each one of a plurality of receiving nodes, corresponding soft complex signal information produced from a superposition of signals received from a plurality of transmitting nodes;
means for jointly detecting signal information from said plurality of transmitting nodes based on the collected soft complex signal information and a complex channel representation related to said plurality of receiving nodes and said plurality of transmitting nodes; and
means for providing quality indicators related to said joint detecting and/or subsequent decoding to a radio resource management unit for power control and/or link mode feedback to transmitting nodes.

14. The network node according to claim 13, wherein said means for jointly detecting said signal information is configured for performing frequency domain handling of joint detection of multiple signals.

15. The network node according to claim 13, wherein said means for jointly detecting said signal information is configured for operation on each OFDMA (Orthogonal Frequency Division Multiple Access) sub-carrier.

16. The network node according to claim 13, wherein said network node comprises said radio resource management unit, and said radio resource management unit is configured for providing power control feedback to transmitting nodes for controlling transmit power with reference to a noise floor.

17. A network node in a wireless communication network, said network node comprising:
means for converting a superposition of signals received from a plurality of transmitting nodes to produce soft complex signal information;
means for collecting soft complex signal information from at least one associated node, each associated node producing soft complex signal information from a superposition of signals received from said plurality of transmitting nodes;
means for jointly detecting signal information based on the acquired soft complex signal information and a complex channel representation related to the network node, each associated node and said plurality of transmitting nodes; and
means for providing quality indicators related to said joint detecting and/or subsequent decoding to a radio resource management unit for power control and/or link mode feedback to transmitting nodes.

18. The network node according to claim 17, wherein said network node comprises said radio resource management unit, and said radio resource management unit is configured for providing power control feedback to transmitting nodes for controlling transmit power with reference to a noise floor.

19. The network node according to claim 17, wherein said means for jointly detecting said signal information is configured for performing frequency domain handling of joint detection of multiple signals.

20. The network node according to claim 17, wherein said means for jointly detecting said signal information is configured for operation on each OFDMA (Orthogonal Frequency Division Multiple Access) sub-carrier.

21. A method for detecting signal information in a wireless communication network having a number of nodes for communication, said method comprising:
each of a plurality of receiving nodes converting a superposition of signals received from a plurality of transmitting nodes to produce soft complex signal information;
collecting soft complex signal information associated with said plurality of receiving nodes over a transport network;
jointly detecting said signal information from at least a subset of said plurality of transmitting nodes based on the collected soft complex signal information;
providing quality indicators related to said joint detecting and/or subsequent decoding to a radio resource management unit for power control and/or link mode feedback to transmitting nodes.

22. The method according to claim 21, wherein said jointly detecting said signal information is performed in the frequency domain.

23. The method according to claim 21, wherein said jointly detecting said signal information is performed for each OFDMA (Orthogonal Frequency Division Multiple Access) sub-carrier.

* * * * *

UNITED STATES PATENT AND TRADEMARK OFFICE
CERTIFICATE OF CORRECTION

| | | |
|---|---|---|
| PATENT NO. | : 7,924,949 B2 | Page 1 of 1 |
| APPLICATION NO. | : 12/588109 | |
| DATED | : April 12, 2011 | |
| INVENTOR(S) | : Larsson | |

It is certified that error appears in the above-identified patent and that said Letters Patent is hereby corrected as shown below:

In Column 1, Line 38, in Equation, delete "$x = G(c_i,$" and insert -- $\mathbf{x} = \mathbf{G}(\mathbf{c}_i,$ --, therefor.

In Column 6, Line 53, delete "$N_i$" and insert -- $N_j$ --, therefor.

Signed and Sealed this
Fourth Day of October, 2011

David J. Kappos
*Director of the United States Patent and Trademark Office*